United States Patent
Humphrey et al.

(10) Patent No.: US 8,912,771 B2
(45) Date of Patent: Dec. 16, 2014

(54) POWER RAIL REGULATOR TO REGULATE DC RAIL VOLTAGE AND OUTPUT CURRENT

(75) Inventors: Daniel Humphrey, Houston, TX (US); Mohamed Amin Bemat, Cypress, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 35 days.

(21) Appl. No.: 13/814,043

(22) PCT Filed: Sep. 13, 2010

(86) PCT No.: PCT/US2010/048660
§ 371 (c)(1), (2), (4) Date: Feb. 4, 2013

(87) PCT Pub. No.: WO2012/036668
PCT Pub. Date: Mar. 22, 2012

(65) Prior Publication Data
US 2013/0128637 A1    May 23, 2013

(51) Int. Cl.
*G05F 1/00* (2006.01)
*H02M 7/04* (2006.01)
*G05F 1/46* (2006.01)
*G06F 1/26* (2006.01)

(52) U.S. Cl.
CPC . *G05F 1/46* (2013.01); *H02M 7/04* (2013.01); *G06F 1/26* (2013.01)
USPC .......................................................... 323/267

(58) Field of Classification Search
USPC ................. 323/234, 237, 265–270, 282–285
See application file for complete search history.

(56) References Cited

U.S. PATENT DOCUMENTS

| | | | |
|---|---|---|---|
| 6,069,809 A * | 5/2000 | Inoshita | 363/98 |
| 6,856,283 B2 | 2/2005 | Jacobson et al. | |
| 6,984,965 B2 * | 1/2006 | Vinciarelli | 323/266 |
| 7,036,028 B2 | 4/2006 | Zalesski | |
| 7,142,438 B2 | 11/2006 | Khalili | |
| 7,304,462 B2 | 12/2007 | Shvarts | |
| 7,730,332 B1 * | 6/2010 | Templeton | 713/300 |
| 7,737,961 B2 | 6/2010 | Chapuis et al. | |
| 2004/0146764 A1 * | 7/2004 | Tsai et al. | 429/27 |
| 2007/0124612 A1 | 5/2007 | Chapuis et al. | |
| 2008/0158917 A1 | 7/2008 | Chen | |

(Continued)

*Primary Examiner* — Adolf Berhane
*Assistant Examiner* — Jeffrey Gblende
(74) *Attorney, Agent, or Firm* — Tarolli, Sundheim, Covell & Tummino LLP; Christopher P Harris

(57) ABSTRACT

A power regulators system and method is disclosed. In one embodiment, a power regulator system (10) is provided and includes at least one power supply (16) each configured to convert a DC rail voltage to a DC load voltage. The DC load voltage can be less than the DC rail voltage and can be provided to power at least one electronic component. The system (10) also includes a power rail regulator (12) configured to generate the DC rail voltage based on an input voltage and to regulate a magnitude of the DC rail voltage to vary between a minimum voltage magnitude and a maximum voltage magnitude and to regulate a variable magnitude of an output current. The DC rail voltage and the output current can be regulated based on load requirements associated with the at least one electronic component (18).

13 Claims, 3 Drawing Sheets

(56) References Cited

U.S. PATENT DOCUMENTS

| | | |
|---|---|---|
| 2009/0179487 A1* | 7/2009 | Liu .................................. 307/31 |
| 2009/0244944 A1 | 10/2009 | Jang et al. |
| 2010/0007221 A1 | 1/2010 | Ye et al. |
| 2010/0013307 A1* | 1/2010 | Heineman et al. .............. 307/33 |
| 2010/0020578 A1 | 1/2010 | Ryu et al. |
| 2010/0156175 A1* | 6/2010 | Wei .................................. 307/31 |
| 2010/0181832 A1* | 7/2010 | Li et al. ........................... 307/31 |
| 2011/0075458 A1* | 3/2011 | Phadke et al. ................. 363/126 |

* cited by examiner

POWER RAIL REGULATOR TO REGULATE DC RAIL VOLTAGE AND OUTPUT CURRENT

BACKGROUND

Computer systems may include different loads that require varied voltages. The varied voltages may require power converters to take a common bus or rail voltage and convert it to meet the required input power characteristics for the load. As an example, a given computer system can include a power rail, such as a 12 volt power rail. The power rail can be used as a bus to power system components, or it can be regulated down to provide the power requirements of a specific load, such as some combination of 3.3 volts and/or 5 volts.

DETAILED DESCRIPTION

Figure 1:
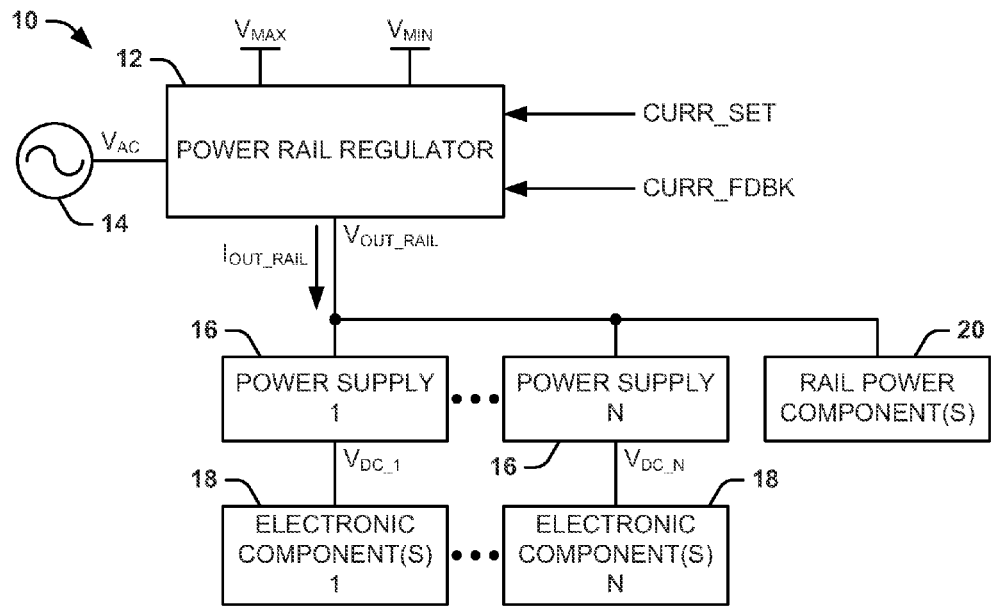
FIG. 1 illustrates an example embodiment of a power regulator system.

FIG. 1 illustrates an example embodiment of a power regulator system 10. The power regulator system 10 can be included in any of a variety of electronic systems, such as computer systems and/or portable electronic devices. The power regulator system 10 includes a power rail regulator 12 that is configured to convert an AC voltage $V_{AC}$ generated from an AC voltage source 14 to a DC output rail voltage $V_{OUT\_RAIL}$. As an example, the AC voltage $V_{AC}$ can be a 120 volt, 60 Hz, AC voltage, such as received from a wall outlet. However, it is to be understood that the AC voltage source 14 in the example of FIG. 1 could instead be implemented as a DC voltage source, such that the power rail regulator 12 converts a DC voltage to the DC output rail voltage $V_{OUT\_RAIL}$. In the example of FIG. 1, the power rail regulator 12 also generates an output current $I_{OUT\_RAIL}$.

The power regulator system 10 also includes a plurality N of power supplies 16, where N is a positive integer. Each of the power supplies 16 can be configured as buck, boost, and/or buck boost converters to convert the DC output rail voltage $V_{OUT\_RAIL}$ to DC voltages $V_{DC\_1}$ through $V_{DC\_N}$, respectively. As an example, the DC voltages $V_{DC\_1}$ through $V_{DC\_N}$ can be any combination of voltage magnitudes, such as 3.3 volts and/or 5 volts. The DC voltages $V_{DC\_1}$ through $V_{DC\_N}$ are each provided to power respective one or more electronic components 18, demonstrated in the example of FIG. 1 as ELECTRONIC COMPONENT(S) 1 through ELECTRONIC COMPONENT(S) N. As an example, the electronic component(s) 18 can include a variety of electronic components, such as computer circuits, chips, and/or processors. In addition, the power regulator system 10 also includes one or more rail power components 20, such as fans and/or motors, that are each powered directly from the DC output voltage $V_{OUT\_RAIL}$.

In the example of FIG. 1, the power rail regulator 12 is configured to vary the magnitude of the DC output rail voltage $V_{OUT\_RAIL}$ and the output current $I_{OUT\_RAIL}$, such as based on load requirements associated with the electronic component(s) 18 and/or the rail power component(s) 20. As an example, the power rail regulator 12 can monitor a feedback signal, demonstrated in the example of FIG. 1 as the signal CURR_FDBK, that is indicative of the power consumption of the electronic component(s) 18 and/or the rail power component(s) 20. As an example, the signal CURR_FDBK could be implemented to provide current consumption information associated with the one or more electronic component(s) 18 and/or the one or more rail power component(s) 20. Alternatively, the signal CURR_FDBK could provide other information indicative of the power consumption of the electronic component(s) 18 and/or the rail power component(s) 20. Thus, the power rail regulator 12 can generate the DC output rail voltage $V_{OUT\_RAIL}$ as having a magnitude that varies from a minimum magnitude to a maximum magnitude, demonstrated in the example of FIG. 1 as voltages $V_{MIN}$ and $V_{MAX}$, respectively. Therefore, the DC output rail voltage $V_{OUT\_RAIL}$ can be generated at lower magnitudes during light load conditions, such as to substantially maximize the efficiencies of the power supplies 16 during light load conditions.

As an example, the power rail regulator 12 can be configured to regulate the DC output rail voltage $V_{OUT\_RAIL}$ and the output current $I_{OUT\_RAIL}$ in different regions that each span a range of output power associated with the power rail regulator 12. In each of the regions, one of the DC output rail voltage $V_{OUT\_RAIL}$ and the output current $I_{OUT\_RAIL}$ can be alternately held at a substantially constant magnitude. For example, the power rail regulator 12 can generate the DC output rail voltage $V_{OUT\_RAIL}$ at a substantially constant minimum magnitude $V_{MIN}$ in a first region spanning a range of output power from zero to a first predetermined output power and can generate the DC output rail voltage $V_{OUT\_RAIL}$ at a substantially constant maximum magnitude $V_{MAX}$ in a last region spanning a range of output power from a second predetermined output power to a maximum power.

Figure 2:
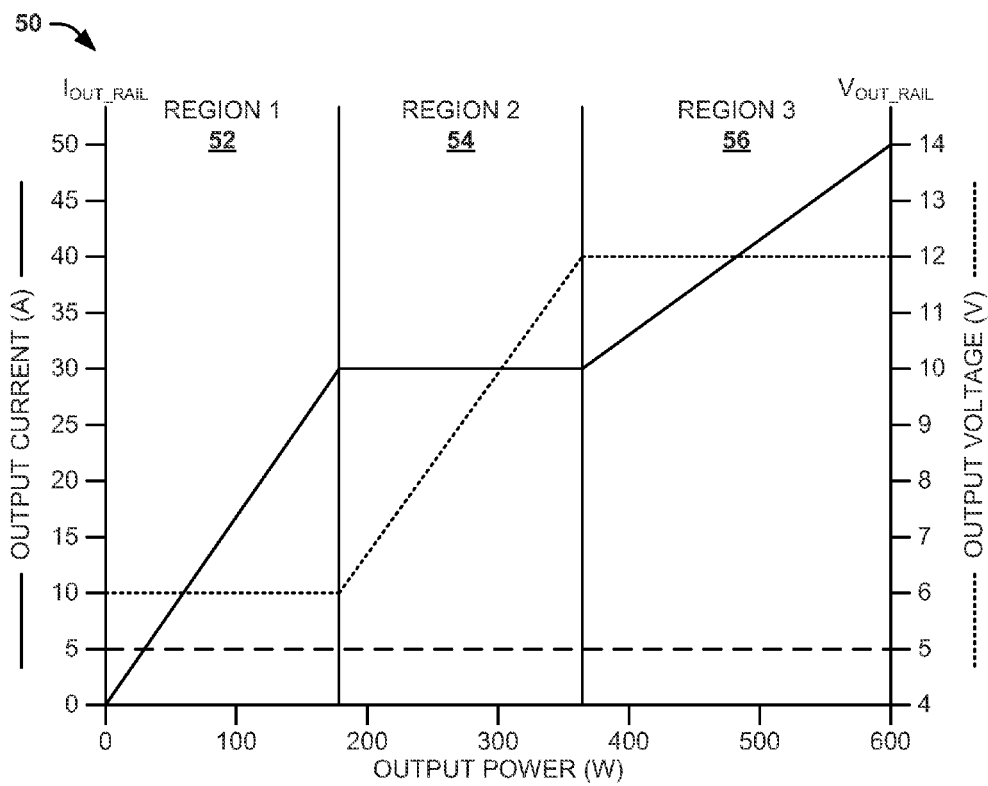
FIG. 2 illustrates an example embodiment of a graph of output voltage and output current for a power rail regulator.

FIG. 2 illustrates an example embodiment of a graph 50 of output voltage and output current for a power rail regulator. The power rail regulator can correspond to the power rail regulator 12 in the example of FIG. 1. Therefore, reference is to be made to the example of FIG. 1 in the following description of the example of FIG. 2.

The graph 50 includes a first vertical axis on which the output current $I_{OUT\_RAIL}$ is demonstrated in amps and a second vertical axis on which the DC output rail voltage $V_{OUT\_RAIL}$ is demonstrated in volts. The graph 50 also includes a horizontal axis on which the output power of the power rail regulator 12 is demonstrated in watts. In the example of FIG. 2, the output current $I_{OUT\_RAIL}$ is plotted as a solid line, while the DC output rail voltage $V_{OUT\_RAIL}$ is plotted as a dotted line.

The graph 50 demonstrates the regulation of the DC output rail voltage $V_{OUT\_RAIL}$ and the output current $I_{OUT\_RAIL}$ in three regions 52, 54, and 56, demonstrated as REGION 1, REGION 2, and REGION 3. Each span a range of the output power associated with the power rail regulator 12. The first region 52 is demonstrated as spanning zero watts to approximately 180 watts. Therefore, the first region 52 can define a substantially light load operating region of the power supply system 10. In the first region 52, the DC output rail voltage $V_{OUT\_RAIL}$ is regulated at a substantially constant magnitude of approximately 6 volts. As an example, the 6 volts could be the minimum voltage magnitude $V_{MIN}$ associated with the power rail regulator 12. As the load requirements of the electronic components 18 and/or the rail power components 20 increase through the first region 52, the power rail regulator 12 increases the output current $I_{OUT\_RAIL}$ to meet the required power.

The second region 54 is demonstrated as spanning approximately 180 watts to approximately 360 watts. The second region 54 can be defined based on a programmable setpoint for the output current $I_{OUT\_RAIL}$, such as provided by a signal CURR_SET demonstrated in the example of FIG. 1. As an example, the programmable setpoint for the output current $I_{OUT\_RAIL}$ can be based on tradeoffs between conductive losses and converter efficiency gains. In the second region 54, the output current $I_{OUT\_RAIL}$ is regulated at a substantially constant magnitude of approximately 30 amps. As the load requirements of the electronic components 18 and/or the rail power components 20 increase through the second region 54, the power rail regulator 12 increases the DC output rail voltage $V_{OUT\_RAIL}$ to meet the required power.

The third region 56 is demonstrated as spanning approximately 360 watts to approximately 600 watts, which could be a maximum power output associated with the power rail regulator 12. The third region 56 can be defined based on the DC output rail voltage $V_{OUT\_RAIL}$ increasing to the maximum magnitude $V_{MAX}$. Thus, in the third region 56, the DC output rail voltage $V_{OUT\_RAIL}$ is regulated at a substantially constant magnitude of approximately 12 volts (e.g., the maximum magnitude $V_{MAX}$). As the load requirements of the electronic components 18 and/or the rail power components 20 increase through the second region 54, the power rail regulator 12 increases the output current $I_{OUT\_RAIL}$ to meet the required power, up to the approximately maximum output power of the power rail regulator 12 (e.g., 600 watts).

Power supplies that generate a DC output voltage from a higher DC source voltage typically operate less efficiently as the difference between the higher DC source voltage and the DC output voltage increases. The power rail regulator 12 thus regulates the DC output rail voltage $V_{OUT\_RAIL}$ and the output current $I_{OUT\_RAIL}$ more efficiently than typical power rail regulators. Specifically, during light load conditions, the power rail regulator 12 operates in the first region 52, thus generating the DC output rail voltage $V_{OUT\_RAIL}$ at the substantially constant minimum magnitude $V_{MIN}$. As a result, the power supplies 16 generate the DC voltages $V_{DC\_1}$ through $V_{DC\_N}$ from a source voltage of approximately 6 volts in the example of FIG. 2, as opposed to a higher voltage that is suitable for any load conditions. Accordingly, the power rail regulator 12 is much more efficient during light load conditions associated with the electronic components 18 and/or the rail power components 20.

In addition, the current setpoint that defines the second region 54 is programmable based on the signal CURR_SET. Thus, the operation of the power rail regulator 12 can be flexibly adjusted to balance conductive losses of the electronic components 18 and/or the rail power components 20 relative to the efficiency gains of the power supplies 16. In addition, the power rail regulator 12 can be configured to regulate the DC output rail voltage $V_{OUT\_RAIL}$ and the output current $I_{OUT\_RAIL}$ in more or less than just three regions. As an example, the power rail regulator 12 can be configured to regulate the DC output rail voltage $V_{OUT\_RAIL}$ and the output current $I_{OUT\_RAIL}$ in any integer of regions, with the DC output rail voltage $V_{OUT\_RAIL}$ being regulated at the minimum voltage $V_{MIN}$ in the first region and at the maximum voltage $V_{MAX}$ in the last region. As another example, the power rail regulator 12 can be configured to regulate the DC output rail voltage $V_{OUT\_RAIL}$ and the output current $I_{OUT\_RAIL}$ in just two regions, with the DC output rail voltage $V_{OUT\_RAIL}$ being regulated at the minimum voltage $V_{MIN}$ in the first region and at the maximum voltage $V_{MAX}$ in the last region, with the magnitude of the output current $I_{OUT\_RAIL}$ varying accordingly in both regions. Furthermore, the power rail regulator 12 could be configured to regulate the DC output rail voltage $V_{OUT\_RAIL}$ in step-wise voltage increments, such as to approximate a substantially constant current, or even to include a negative slope of the output current $I_{OUT\_RAIL}$.

Therefore, the signal CURR_SET can be implemented to set multiple current setpoints in intermediate regions, thus allowing further flexibility of the operation of the power rail regulator 12. Furthermore, it is to be understood that the regions 52, 54, and 56 are not limited to maintaining one of the DC output rail voltage $V_{OUT\_RAIL}$ and the output current $I_{OUT\_RAIL}$ at a constant magnitude, but could instead regulate both of the DC output rail voltage $V_{OUT\_RAIL}$ and the output current $I_{OUT\_RAIL}$ at variable magnitudes in each of the regions. Thus, the power rail regulator 12 can be configured in a variety of ways.

While it is described herein that the regions 52, 54, and 56 span a range of output power associated with the power rail regulator 12, it should be noted that the regions 52, 54, and 56 can instead be considered as defined by the magnitude of the output current $I_{OUT\_RAIL}$ based on the relationship of the output current $I_{OUT\_RAIL}$ with the DC output rail voltage $V_{OUT\_RAIL}$ and based on the DC output rail voltage $V_{OUT\_RAIL}$ being substantially constant in the first and last regions 52 and 56. Thus, as described herein, it is to be understood that the definitions of the boundaries between the regions 52, 54, and 56 can be based on output power or the magnitude of the output current $I_{OUT\_RAIL}$.

Figure 3:
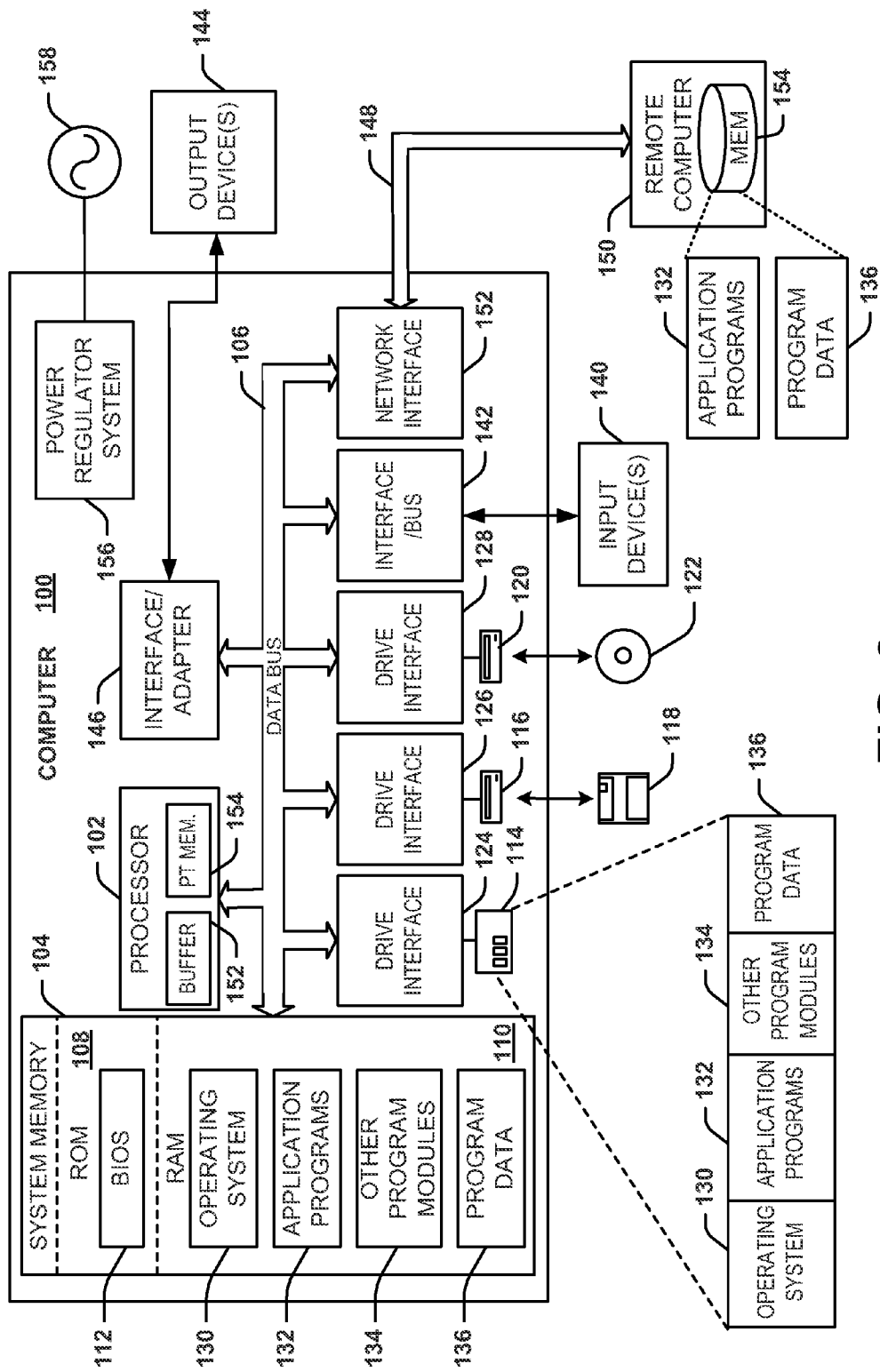
FIG. 3 illustrates an example embodiment of a computer system.

FIG. 3 illustrates an example of a computer system 100 that can be employed to implement systems and methods described herein, such as based on computer executable instructions running on the computer system. The computer system 100 can be implemented on one or more general purpose networked computer systems, embedded computer systems, routers, switches, server devices, client devices, various intermediate devices/nodes and/or stand alone computer systems. Additionally, the computer system 100 can be implemented as part of a network analyzer or associated design tool running computer executable instructions to perform methods and functions, as described herein.

The computer system 100 includes a processor 102 and a system memory 104. A system bus 106 couples various system components, including the system memory 104 to the processor 102. Dual microprocessors and other multi-processor architectures can also be utilized as the processor 102. The system bus 106 can be implemented as any of several types of bus structures, including a memory bus or memory controller, a peripheral bus, and a local bus using any of a variety of bus architectures. The system memory 104 includes read only memory (ROM) 108 and random access memory (RAM) 110. A basic input/output system (BIOS) 112 can reside in the ROM 108, generally containing the basic routines that help to transfer information between elements within the computer system 100, such as a reset or power-up.

The computer system 100 can include a hard disk drive 114, a magnetic disk drive 116, e.g., to read from or write to a removable disk 118, and an optical disk drive 120, e.g., for reading a CD-ROM or DVD disk 122 or to read from or write to other optical media. The hard disk drive 114, magnetic disk drive 116, and optical disk drive 120 are connected to the system bus 106 by a hard disk drive interface 124, a magnetic disk drive interface 126, and an optical drive interface 134, respectively. The drives and their associated computer-readable media provide nonvolatile storage of data, data structures, and computer-executable instructions for the computer system 100. Although the description of computer-readable media above refers to a hard disk, a removable magnetic disk and a CD, other types of media which are readable by a computer, may also be used. For example, computer executable instructions for implementing systems and methods described herein may also be stored in magnetic cassettes, flash memory cards, digital video disks and the like. A number of program modules may also be stored in one or more of the drives as well as in the RAM 110, including an operating system 130, one or more application programs 132, other program modules 134, and program data 136.

A user may enter commands and information into the computer system 100 through user input device 140, such as a keyboard, a pointing device (e.g., a mouse). Other input devices may include a microphone, a joystick, a game pad, a scanner, a touch screen, or the like. These and other input devices are often connected to the processor 102 through a corresponding interface or bus 142 that is coupled to the system bus 106. Such input devices can alternatively be connected to the system bus 106 by other interfaces, such as a parallel port, a serial port or a universal serial bus (USB). One or more out device(s) 144, such as a visual display device or printer, can also be connected to the system bus 106 via an interface or adapter 146.

The computer system 100 may operate in a networked environment using logical connections 148 to one or more remote computers 150. The remote computer 148 may be a workstation, a computer system, a router, a peer device or other common network node, and typically includes many or all of the elements described relative to the computer system 100. The logical connections 148 can include a local area network (LAN) and a wide area network (WAN).

When used in a LAN networking environment, the computer system 100 can be connected to a local network through a network interface 152. When used in a WAN networking environment, the computer system 100 can include a modem (not shown), or can be connected to a communications server via a LAN. In a networked environment, application programs 132 and program data 136 depicted relative to the computer system 100, or portions thereof, may be stored in memory 154 of the remote computer 150.

By way of further example, the computer system 100 includes a power regulator system 156. The power regulator system 156 can be configured substantially similar to the power regulator system 10 in the example of FIG. 1. Specifically, the power regulator system 156 can include a power rail regulator, such as the power rail regulator 12 in the example of FIG. 1, that can generate a DC output rail voltage from an AC voltage generated by an AC voltage source 158. The power rail regulator can vary the magnitude of the DC output rail voltage and an associated output current, such as based on load requirements associated with other electronic components in the computer system 100. As an example, the power rail regulator can regulate the DC output rail voltage and the associated output current in a number of regions that each span a range of output power of the power rail regulator, such as demonstrated in the example of FIG. 2. Thus, additional power supplies that generate DC voltages that power the other electronic components in the computer system 100 can operate more efficiently, such as during light load conditions.

Figure 4:
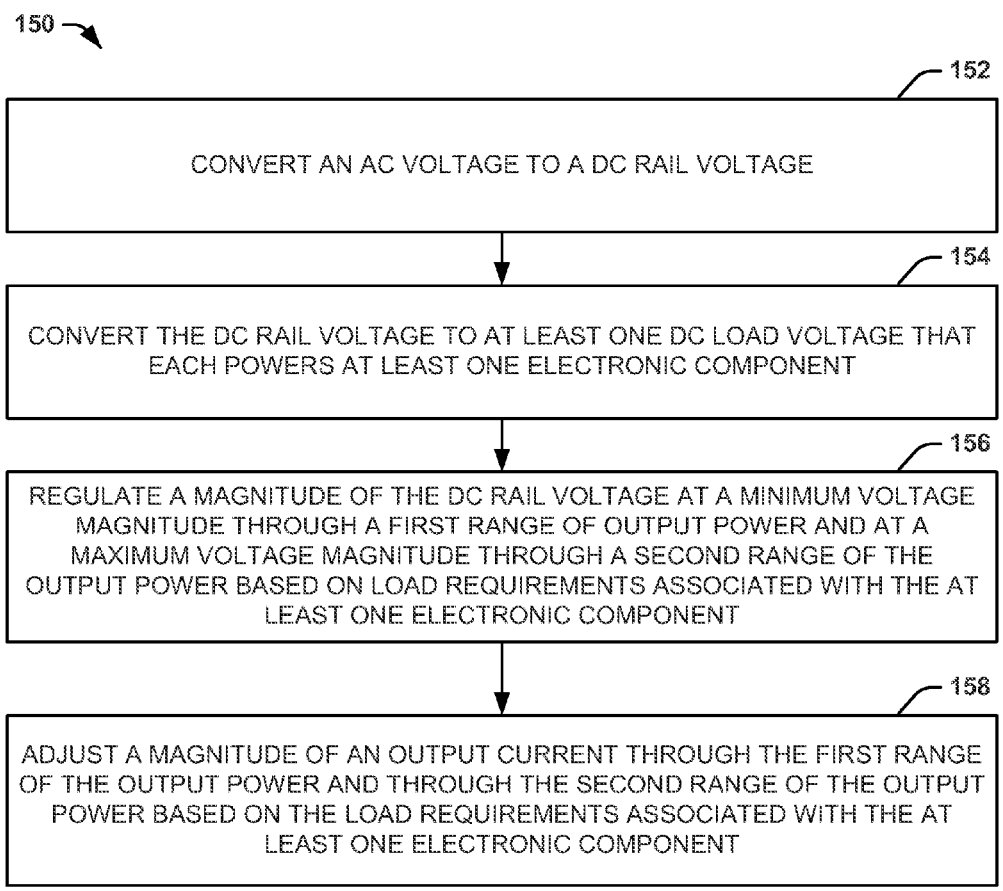
FIG. 4 illustrates an example embodiment of a method for providing power.

In view of the foregoing structural and functional features described above, an example methodology will be better appreciated with reference to FIG. 4. While, for purposes of simplicity of explanation, the methodology of FIG. 4 is shown and described as executing serially, it is to be understood and appreciated that the present invention is not limited by the illustrated order, as some embodiments could in other embodiments occur in different orders and/or concurrently from that shown and described herein.

FIG. 4 illustrates an example embodiment of a method 150 for providing power. At 152, an AC voltage is converted to a DC rail voltage. At 154, the DC rail voltage is converted to at least one DC load voltage that each powers at least one electronic component. At 156, a magnitude of the DC rail voltage is regulated at a minimum voltage magnitude through a first range of output power and at a maximum voltage magnitude through a second range of the output power based on load requirements associated with the at least one electronic component. At 158, a magnitude of an output current associated with the DC rail voltage is adjusted through the first range of the output power and through the second range of the output power based on the load requirements associated with the at least one electronic component.

What have been described above are examples of the invention. It is, of course, not possible to describe every conceivable combination of components or methodologies for purposes of describing the invention, but one of ordinary skill in the art will recognize that many further combinations and permutations of the invention are possible. Accordingly, the invention is intended to embrace all such alterations, modifications, and variations that fall within the scope of this application, including the appended claims.

What is claimed is:

1. A power regulator system comprising:
   at least one power supply to convert a DC rail voltage to a DC load voltage, the DC load voltage being less than the DC rail voltage and being provided to power at least one electronic component; and
   a power rail regulator to generate the DC rail voltage based on an input voltage and to regulate a magnitude of the DC rail voltage to vary between a minimum voltage magnitude and a maximum voltage magnitude and to further regulate a variable magnitude of an output current, the DC rail voltage and the output current being regulated based on load requirements associated with the at least one electronic component,
   wherein the power rail regulator to regulate the DC rail voltage and the output current in N regions across a range of output power, where N is an integer greater than one, the regions defined as alternating between a substantially constant magnitude of the DC rail voltage with a variable magnitude of the output current and a substantially constant magnitude of the output current with a variable magnitude of the DC rail voltage,
   a first of the N regions defined as the DC rail voltage having the substantially constant magnitude that is approximately equal to the minimum voltage magnitude at a first range of the output power from zero to a first power magnitude, and
   a last of the N regions defined as the DC rail voltage having the substantially constant magnitude that is approximately equal to the maximum voltage magnitude at a second range of the output power from a second power magnitude to a maximum power magnitude.

2. The system of claim 1, wherein the first and second power magnitudes are each programmable.

3. The system of claim 1, wherein the minimum and maximum voltage magnitudes are each programmable.

4. The system of claim 1, further comprising at least one additional electronic component that is powered directly from the DC rail voltage.

5. A computer system comprising the power regulator system of claim 1.

6. A method for providing power, the method comprising:
converting an AC voltage to a DC rail voltage;
converting the DC rail voltage to at least one DC load voltage that each powers at least one electronic component;
regulating a magnitude of the DC rail voltage at a minimum voltage magnitude through a first range of output power and at a maximum voltage magnitude through a second range of output power based on load requirements associated with the at least one electronic component;
adjusting a magnitude of an output current associated with the DC rail voltage through the first range of the output power and through the second range of the output power based on the load requirements associated with the at least one electronic component; and
defining N regions across the first and the second range of output power to regulate the DC rail voltage and the output current, where N is an integer greater than one, the regions defined as alternating between a substantially constant magnitude of the DC rail voltage with a variable magnitude of the output current and a substantially constant magnitude of the output current with a variable magnitude of the DC rail voltage,
a first of the N regions defined as the DC rail voltage having the substantially constant magnitude that is approximately equal to the minimum voltage magnitude at a first range of the output power from zero to a first power magnitude, and
a last of the N regions defined as the DC rail voltage having the substantially constant magnitude that is approximately equal to the maximum voltage magnitude at a second range of the output power from a second power magnitude to a maximum power magnitude.

7. The method of claim 6, further comprising holding a magnitude of the output current substantially constant through a third range of output power that is between the first range of output power and the second range of output power.

8. The method of claim 7, further comprising setting the substantially constant magnitude of the output current in the third range of output power based on conductive losses associated with the at least one electronic component.

9. The method of claim 6, further comprising holding a magnitude of the DC rail voltage substantially constant through a third range of output power that is between the first range of output power and the second range of output power.

10. The method of claim 6, further comprising programming the minimum voltage magnitude and the maximum voltage magnitude.

11. A power regulator system comprising:
at least one power supply each to convert a DC rail voltage to a DC load voltage, the DC load voltage being less than the DC rail voltage and being provided to power at least one electronic component; and
a power rail regulator to generate the DC rail voltage based on an AC voltage and to regulate a magnitude of the DC rail voltage and an output current through N regions across a range of output power, where N is an integer greater than one, such that one of the DC rail voltage and the output current is alternately substantially constant in each of the N regions based on load requirements associated with the at least one electronic component,
a first of the N regions defined as the DC rail voltage having a substantially constant magnitude that is approximately equal to a minimum voltage magnitude at a first range of the output power from zero to a first power magnitude, and
a last of the N regions defined as the DC rail voltage having the substantially constant magnitude that is approximately equal to a maximum voltage magnitude at a second range of the output power from a second power magnitude to a maximum power magnitude.

12. The system of claim 11, wherein the power rail regulator varies the DC rail voltage between a programmable minimum voltage magnitude in the first of the N regions and a programmable maximum voltage magnitude in the last of the N regions.

13. The system of claim 11, wherein the output current has a substantially constant magnitude in at least one of the N regions, the substantially constant magnitude being set based on conductive losses associated with the at least one electronic component.

* * * * *